S. L. SWEENEY.
Corn Planter.
No. 83,105.  Patented Oct. 13, 1868.
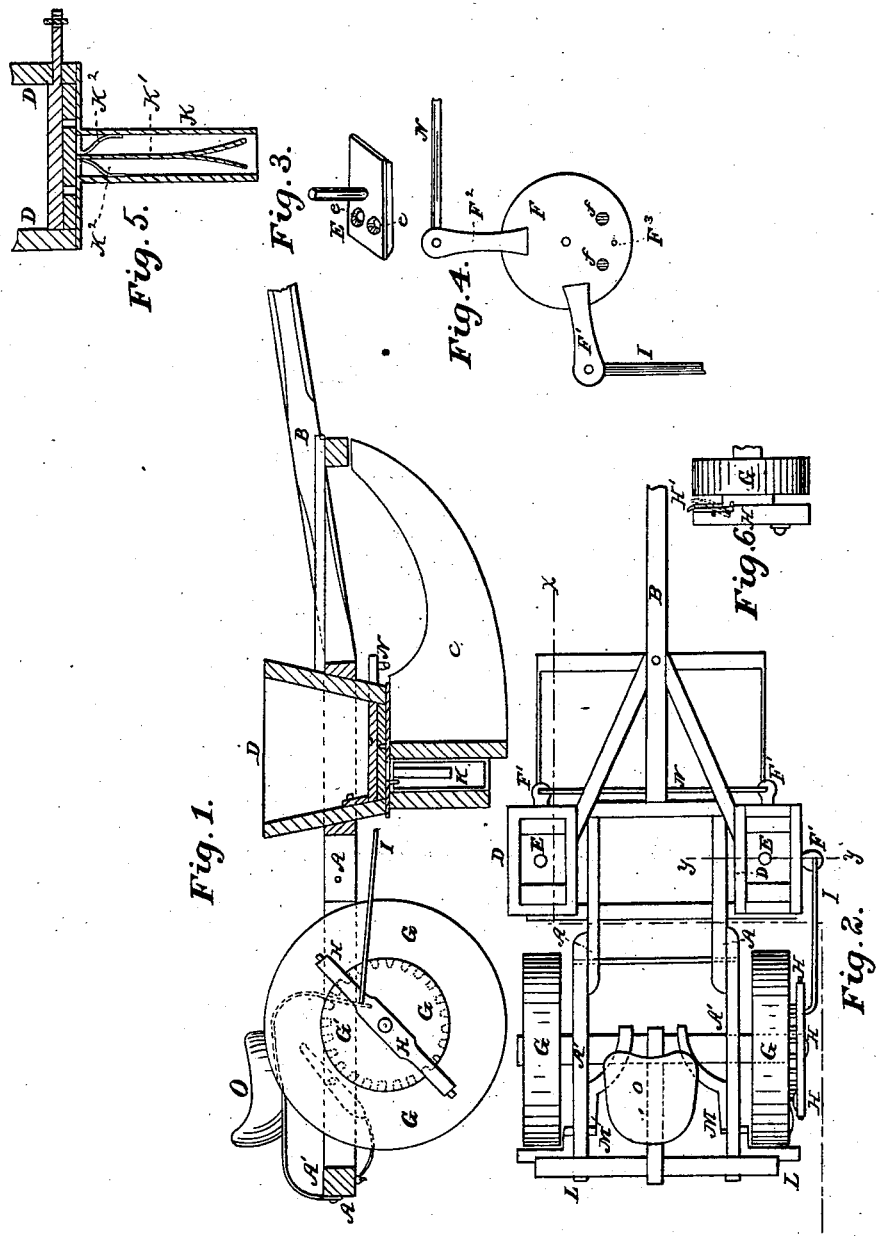

SAMUEL L. SWEENEY OF MORRISON, ILLINOIS.

Letters Patent No. 83,105, dated October 13, 1868.

IMPROVEMENT IN CORN-PLANTERS.

The Schedule referred to in these Letters Patent and making part of the same.

*To all whom it may concern:*

Be it known that I, SAMUEL L. SWEENEY, of Morrison, in the county of Whitesides, and State of Illinois, have invented a new and useful Improvement in Corn-Planters; and I do hereby declare that the following is a full, clear, and exact description of the same, reference being had to the annexed drawings, making part of this specification, in which—

Figure 1 is a vertical longitudinal section on the line $x\ x$, fig. 2;

Figure 2 is a plan;

Figure 3 is a perspective view of one of the plates in the hopper;

Figure 4, a plan of the dropping-wheel;

Figure 5 is a section on the line $y\ y$, fig. 2; and

Figure 6 is a side elevation of the wheel and attachments.

The same letters in all the figures are used to indicate the same parts.

The frame is composed of two parts, A and A', hinged together by a rod. The front part of the frame A supports the dropping-mechanism, and the rear portion the covering-wheels and driver's seat.

B is the tongue, and C the cutters, which, being attached to the lower side of the frame A, are formed to open a furrow, into which the grain is to be dropped.

D D are the hoppers, having in the bottom a metallic plate, E, constructed with two holes, $f f$, corresponding in position with the holes $e\ e$. This plate-wheel rests on another plate, which forms the bottom of the hopper.

The wheel F receives an oscillating motion from the arm $F^1$, connected by the rod I with a wrist-pin on the arm H, attached to and revolving with the wheel G.

Another arm, $F^2$, on one wheel, is connected by the rod N with a similar arm on the other dropping-wheel, so that one of these wheels, receiving its motion directly from the wheel G, communicates it to the other.

When the holes $e\ e$ are filled with grains, and are turned until one of them is over the hole $f$, the latter will be filled with the grain to be dropped, which, when it is carried over the tube K, will fall into the same, lodging on one of the bifurcations of the partition $K^1$. The tube is divided by the bifurcated partition K, which is centrally pivoted to the tube, so as to permit its lateral oscillation.

A pin, $F^3$, is placed on the wheel F, between the holes $f f$, so that as the wheel oscillates, the top part of the partition $K^1$, being struck by the pin, will be pushed to one side, and be immediately restored to the perpendicular position, on being disengaged, by one of the springs, $K^2$, placed on each side thereof. This action will cause the lower end of the tube to be opened, so as to permit the instantaneous discharge of the grain into the furrow.

The wheels G act as rollers to cover the grain in the furrows. An arm, H, is attached to the axle of one of the wheels, and constructed with a spring-catch, H', by which it is secured to the wheel by the point of the catch entering one of the holes G'.

When it is desired to intermit the dropping-action, the catch being disengaged, the wheel G will revolve without turning the arm H.

Scrapers, L L, are attached to the hind part of the wheels, to clear the earth from the face of the wheels G, when the levers M are so operated as to bring the edge of the scraper against the wheel.

O is the driver's seat, resting on the hind frame A'.

The ends of the arm H, as they revolve, will make a mark on the ground, to indicate where a hill of grain has been deposited, thus enabling the driver to tell when the hills are properly arranged in rows, so as to permit the growing corn to be cultivated in both directions.

What I claim as my invention, and desire to secure by Letters Patent, is—

1. The combination of the roller-wheel G, arm H, rod I, and oscillating plate F, arranged to operate substantially as and for the purpose set forth.

2. The combination of the wheel G, the arm H, connecting-rods I and N, with the two oscillating wheels F, arranged substantially as set forth.

3. The combination of the wheel G with holes G', and arm H with holes H', for connecting and disconnecting the wheels and the dropping-mechanism, substantially as set forth.

In testimony whereof, I have signed my name to this specification in the presence of two subscribing witnesses.

SAMUEL L. SWEENEY.

Witnesses:
C. C. CLENDENIN,
FRANK CLENDENIN.